United States Patent [19]
Chen et al.

[11] Patent Number: 5,791,203
[45] Date of Patent: Aug. 11, 1998

[54] BICYCLE CRANKSET

[76] Inventors: Chia-Lung Chen, 33-4, Pu Kang Road, Chu Shui Village, Pu Yai Hsiang, Changhua; Yin-Dong Liu, 113, Alley 11, Lane 467, Sec. 3, Yuan Chi Road, She Tou Hsiang, Changhua; Long-Shui Wu, 587, Sec. 2, Chang Shui Road, Hsi Hu Town, Changhua, all of Taiwan

[21] Appl. No.: 683,173

[22] Filed: Jul. 18, 1996

[51] Int. Cl.$^6$ .................................................. G05G 1/14
[52] U.S. Cl. .................... 74/594.2; 74/594.1; 81/436; 81/437
[58] Field of Search ............................ 74/594.1, 594.2, 74/594.3; 81/436, 437, 459, 488, 57.4

[56] References Cited

U.S. PATENT DOCUMENTS

| | | | |
|---|---|---|---|
| 4,201,120 | 5/1980 | Segawa | 74/594.2 |
| 4,300,411 | 11/1981 | Segawa | 74/594.2 |
| 4,331,043 | 5/1982 | Shimano | 74/594.2 |
| 4,732,060 | 3/1988 | Stein | 81/462 X |
| 4,960,017 | 10/1990 | Hsiao | 81/459 |
| 5,099,726 | 3/1992 | Hsiao | 81/459 |
| 5,363,721 | 11/1994 | Hsiao | 74/594.1 |
| 5,493,937 | 2/1996 | Edwards | 74/594.1 |

FOREIGN PATENT DOCUMENTS

| | | | |
|---|---|---|---|
| 934104 | 5/1948 | France | 74/594.1 |
| 1056870 | 3/1954 | France | 74/594.1 |
| 1273107 | 8/1961 | France | 74/594.1 |
| 1509090 | 4/1978 | United Kingdom | 74/594.2 |

*Primary Examiner*—Vinh T. Luong
*Attorney, Agent, or Firm*—Beveridge, DeGrandi, Weilacher & Young LLP

[57] ABSTRACT

The crank arm of a bicycle is detachably secured to a receiving portion of the crank axle by disposing the receiving portion within a tapered hole formed in an inner side of the crank arm and threadedly engaging a bolt within a threaded hole in the receiving portion by applying a wrench through an axial hole of a bolt cover which is threadedly engaged within a threaded portion formed in an outer side of the crank arm.

4 Claims, 4 Drawing Sheets

BICYCLE CRANKSET

FIELD OF THE INVENTION

The present invention relates generally to a bicycle, and more particularly to a crankset of the bicycle.

BACKGROUND OF THE INVENTION

As shown in FIG. 4, a bicycle crankset of the prior art comprises a crank A, which is fastened at the bottom end thereof with a pedal (not shown in the drawing) and is provided at the top end thereof with a plurality of crank claws B which are made integrally therewith and are fastened with a sprocket wheel C. The crank A is further provided at the center of the top end thereof with a rectangular tapered hole D, which is in turn provided in the outer side thereof with a recess E. Both the tapered hole D and the recess E are intended for use in fastening the crank A with a crank axle F which is provided with a receiving portion H. The fastening of the crank A with the crank axle F is done in conjunction with a screw G.

Such a prior art bicycle crankset as described above is defective in design in that it is rather difficult for a bicycle repairman to disengage the crank and the crank axle so as to repair the damaged crank or crank axle.

SUMMARY OF THE INVENTION

The primary objective of the present invention is therefore to provide an improved bicycle crankset capable of overcoming the deficiency of the prior art bicycle crankset described above.

The bicycle crankset of the present invention is composed of a crank arm, which is fastened at the bottom end thereof with a pedal and is provided at the top end thereof with a plurality of crank claws made integrally therewith. The crank claws are fastened with a sprocket wheel and outwardly from a tapered hole which is provided with a threaded portion engagable with a bolt cover having an axial hole engagable with a rotating device. The bolt cover is provided therein with a bolt head groove engagable with the head of a bolt. The bolt is intended for use in fastening the crank arm with the crank axle. The crank arm and the crank axle can be easily disengaged from each other by unfastening the bolt.

The foregoing objective, features, functions and advantages of the present invention will be more readily understood from the following detailed description of a preferred embodiment of the present invention in conjunction with the accompanying drawings.

BRIEF DESCRIPTION OF THE INVENTION

FIG. 4 is a sectional view of a prior art bicycle crankset in.

DETAILED DESCRIPTION OF THE PREFERRED EMBODIMENT

Figure 1:
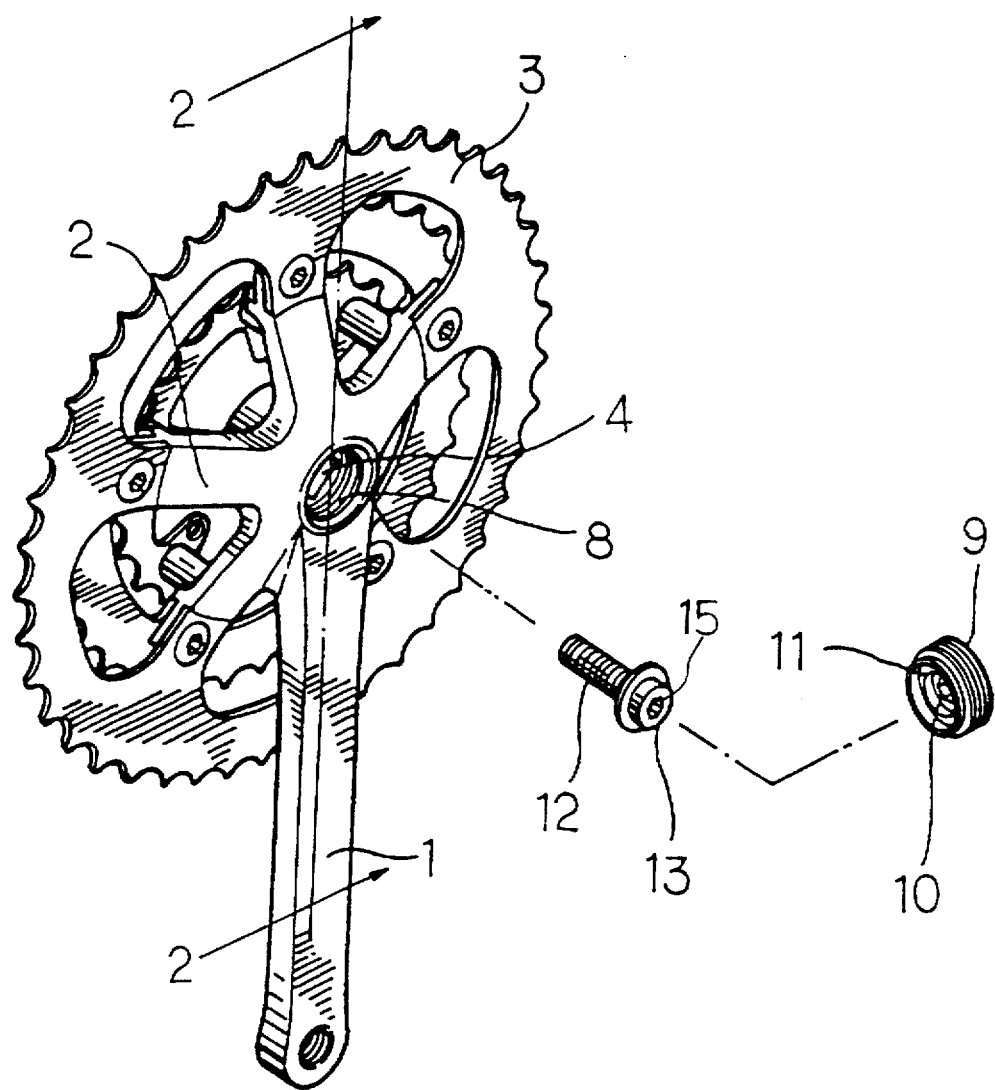
FIG. 1 shows an exploded view of a bicycle crankset according to the present invention.
Figure 2:
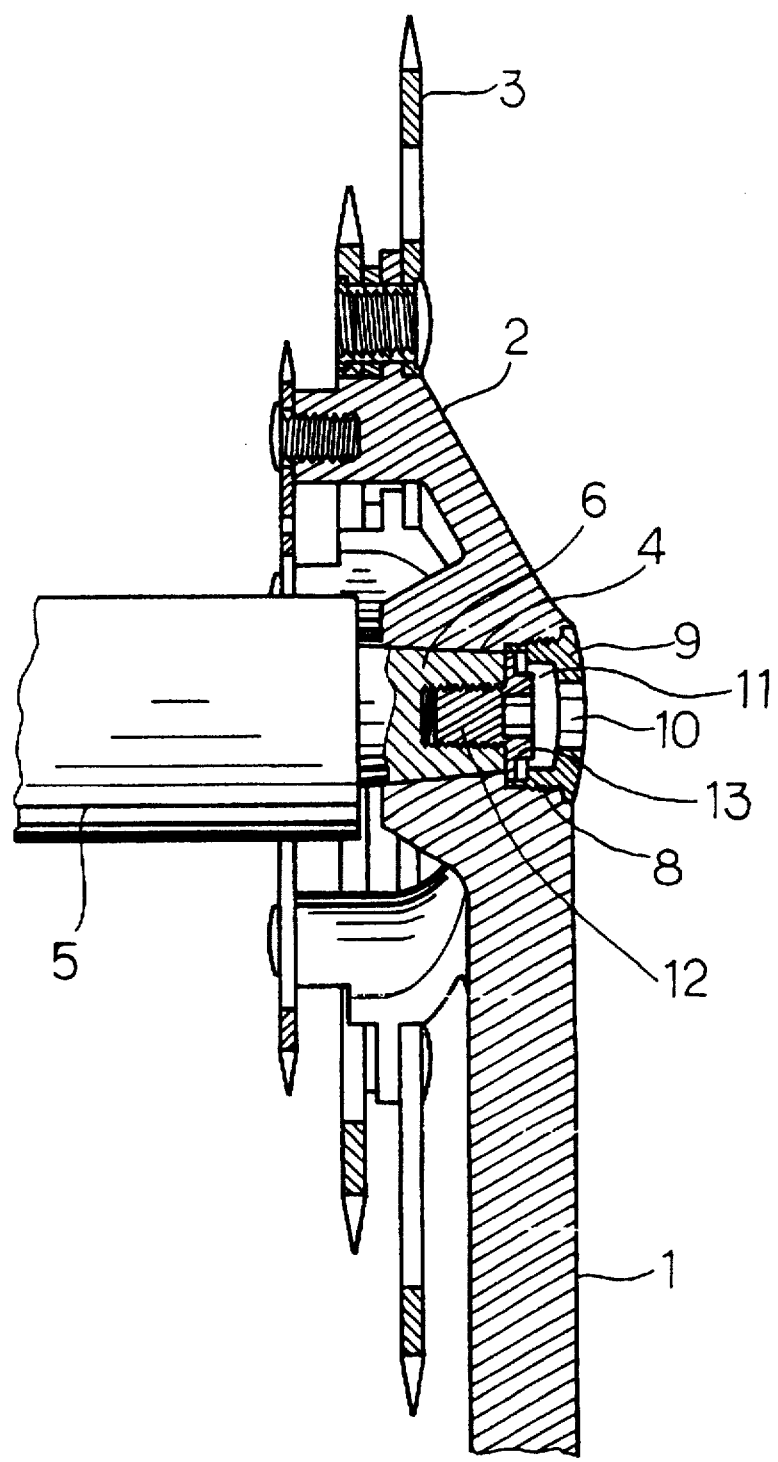
FIG. 2 shows a sectional view of the bicycle crankset taken along the line 2—2 of FIG.1.
Figure 3:
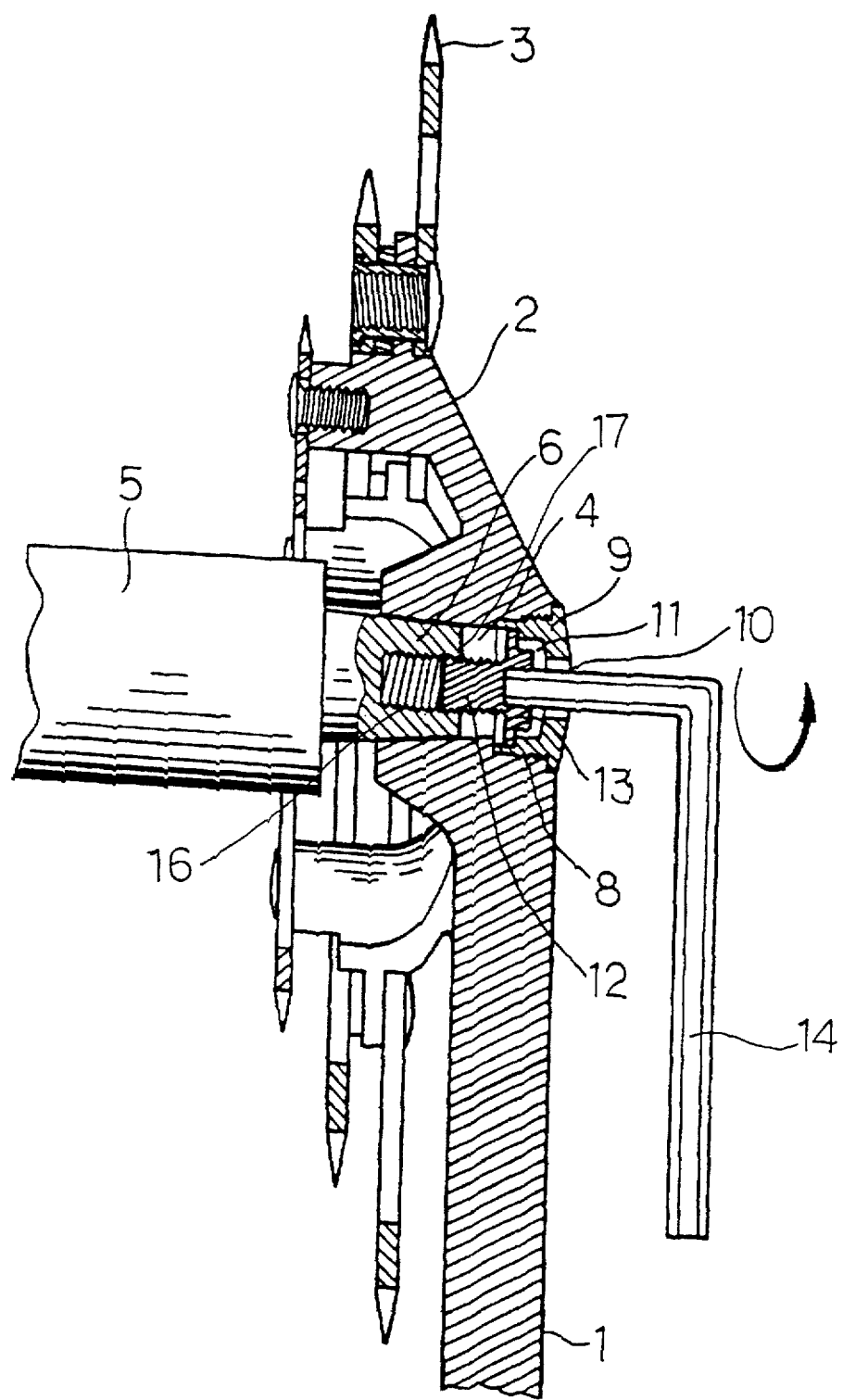
FIG. 3 is the sectional view shown in FIG. 2 illustrating the process of disengaging the crank from the crank axle of the crankset.
Figure 4:
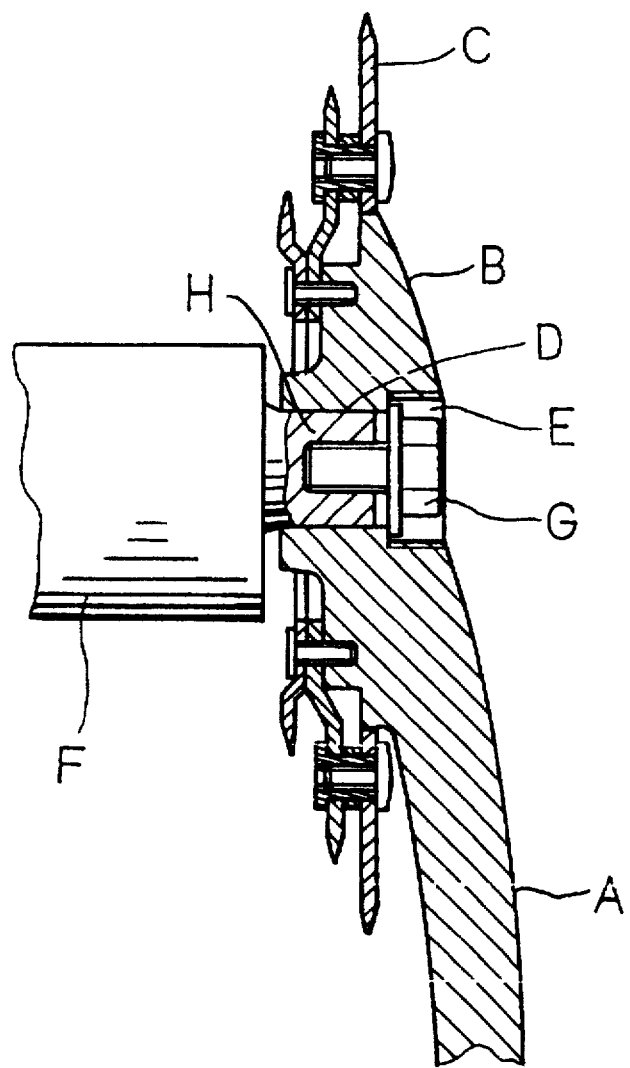

As shown in FIGS. 1–3, a crankset of the preferred embodiment of the present invention comprises a crank arm 1, a sprocket wheel 3, and a crank axle 5. The crank arm 1 is fastened at the bottom end thereof with a pedal (not shown in the drawings) and is provided at the top end thereof with a plurality of crank claws 2 made integrally therewith. The crank claws 2 are arranged in a manner such that they radiate or branch out from a tapered hole 4 which is engaged with a receiving portion 6 of crank axle 5. Receiving portion 6 is providing with a threaded hole 16 extending inwardly from an end face 17. The crank claws 2 are fastened to the sprocket wheel 3.

The crankset of the present invention is characterized in that the tapered hole 4 is provided in the inner wall of an outer end thereof with a threaded portion 8 engagable with the outer threads of a bolt cover 9. The bolt cover 9 is provided therein with an axial hole 10 through which a rotating device, such as a hexagonal wrench 14, maybe passed. The axial hole 10 has a hexagonal cross-sectional configuration and is provided with a bolt head groove 11 for locating the head 13 of a bolt 12. The bolt 12 is provided axially with a hexagonal hole 15 extending through the head 13 and having a diameter smaller than the diameter of the axial hole 10 of the bolt cover 9. It is therefore readily apparent that the crank arm 1 and the crank axle 5 of the crankset of the present invention can be easily assembled and disassembled by means of a hexagonal wrench. In other words, the bolt 12 can be fastened or unfastened by engaging hexagonal wrench 14 with the hexagonal hole 15 of the bolt 12 through the axial hole 10 of the bolt cover 9 and rotating bolt 12 so that it may threadedly engage or disengage threaded hole 16 of receiving portion 6. As the bolt 12 is unfastened, the head 13 of the bolt 12 is caused to move outwards so as to force the tapered hole 4 of the crank arm 1 to become disengaged from the receiving portion 6 of the crank axle 5, as illustrated in FIG. 3.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A bicycle crankset comprising:

a) a crank arm having a first end for securing a pedal to the arm and a second end including a tapered hole extending inwardly from an inner side of the second end, a plurality of crank claws radiating outwardly from the tapered hole and a threaded portion extending inwardly from an outer side of the second end;

b) a crank axle having a receiving portion detachably engagable within the tapered hole of the crank arm, the receiving portion including a threaded hole extending inwardly from an end face of the receiving portion;

c) a threaded bolt engagable within the threaded hole of the receiving portion, the bolt including a head for engagement by a tool to rotate the bolt; and d) a threaded bolt cover engagable with the threaded portion of the crank arm, the bolt cover having an axial hole formed therethrough for permitting the tool to access the head of the bolt, and the axial hole including a groove for locating the head of the bolt.

2. The bicycle crankset of claim 1 wherein the head means of the bolt includes a hexagonal hole formed therein for engagement by a hexagonal wrench.

3. The bicycle crankset of claim 1, wherein the axial hole of the bolt cover has a hexagonal cross sectional configuration.

4. The bicycle crankset of claim 1, further including a sprocket wheel fastened to the crank claws of the crank arm.

* * * * *